US009250666B2

(12) United States Patent
Baysah et al.

(10) Patent No.: US 9,250,666 B2
(45) Date of Patent: Feb. 2, 2016

(54) SCALABLE DATA COLLECTION FOR SYSTEM MANAGEMENT

(71) Applicant: International Business Machines Corporation, Armonk, NY (US)

(72) Inventors: Irving Baysah, Coupland, TX (US); John S. Dodson, Austin, TX (US); Karthick Rajamani, Austin, TX (US); Eric E. Retter, Austin, TX (US); Gregory S. Still, Raleigh, NC (US); Malcolm S. Allen-Ware, Austin, TX (US); Scot H. Rider, Pleasant Valley, NY (US); Todd J. Rosedahl, Zumbrota, MN (US); Gary Van Huben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 13/686,391

(22) Filed: Nov. 27, 2012

(65) Prior Publication Data
US 2014/0149751 A1 May 29, 2014

(51) Int. Cl.
G06F 1/20 (2006.01)
G06F 1/32 (2006.01)

(52) U.S. Cl.
CPC ........ G06F 1/206 (2013.01); G06F 1/32 (2013.01); G06F 1/3203 (2013.01); G06F 1/3206 (2013.01); Y02B 60/1203 (2013.01); Y02B 60/1275 (2013.01)

(58) Field of Classification Search
CPC ................................................. Y02B 60/1203
See application file for complete search history.

(56) References Cited

U.S. PATENT DOCUMENTS

| 6,018,803 | A  | * | 1/2000  | Kardach .................... 713/323 |
|-----------|----|---|---------|-------------------------------------|
| 7,260,007 | B2 |   | 8/2007  | Jain et al.                         |
| 7,421,598 | B2 |   | 9/2008  | Brittain et al.                     |
| 8,014,971 | B2 |   | 9/2011  | Artman et al.                       |
| 8,068,940 | B2 | * | 11/2011 | Adachi et al. ............... 700/299 |
| 2005/0071698 | A1 | * | 3/2005 | Kangas ....................... 713/300 |
| 2005/0102539 | A1 | * | 5/2005 | Hepner et al. ............... 713/300 |
| 2005/0169294 | A1 | * | 8/2005 | Tseng et al. ................. 370/437 |
| 2007/0220101 | A1 | * | 9/2007 | Katsuo ........................ 709/208 |

(Continued)

OTHER PUBLICATIONS

"System-on-Chip Next Generation Electronics", Ed. Al-Hashimi, Bashir, 2006, MPG Books Ltd., p. 588-589.*

(Continued)

Primary Examiner — Jaweed A Abbaszadeh
Assistant Examiner — Cheri Harrington
(74) Attorney, Agent, or Firm — DeLizio Law, PLLC

(57) ABSTRACT

A system with scalable data collection for system management comprises a plurality of local data collectors and a system collector. Each of the local data collectors is coupled with a corresponding subsystem of the system. Each of the local data collectors is configured to periodically collect power management related data from the corresponding subsystem, and to format the collected power management related data for conveyance along any one of a plurality of channels between the local data collector and the system collector. The system collector is coupled with the plurality of local data collectors via the plurality of channels. The system collector selects from the channels between the system collector and each of the local data collectors based, at least in part, on channel states, and retrieves the power management related data collected by each of the local data collectors along a selected channel for the local data collector.

19 Claims, 4 Drawing Sheets

(56) References Cited

U.S. PATENT DOCUMENTS

| | | |
|---|---|---|
| 2008/0151913 A1* | 6/2008 | El-Damhougy et al. ...... 370/401 |
| 2009/0207735 A1* | 8/2009 | Ben Letaief et al. ......... 370/237 |
| 2012/0149387 A1* | 6/2012 | Rawat et al. ............... 455/456.1 |
| 2013/0155081 A1* | 6/2013 | Khodorkovsky et al. ..... 345/522 |
| 2013/0315128 A1* | 11/2013 | Zhao ............................. 370/312 |
| 2014/0067139 A1* | 3/2014 | Berke et al. ................... 700/291 |

OTHER PUBLICATIONS

Velusamy, Siva et al., "Monitoring Temperature in FPGA based SoCs", IEEE Proceedings of the 2005 International Conference on Computer Design, 2005, pp. 1-4.

* cited by examiner

SCALABLE DATA COLLECTION FOR SYSTEM MANAGEMENT

BACKGROUND

Embodiments of the inventive subject matter generally relate to the field of power management, and, more particularly, to distributed collection of information for power management.

Power densities of systems have been increasing with the complexity of systems. The increase in power density affects thermal conditions and performance of the system. Power management of a complex system uses various sensors to monitor the myriad of components and subsystems and collect information about environmental conditions and events that impact system performance. Power management relies on timely communication of this information in order to take reactive or proactive actions to preserve performance.

SUMMARY

Embodiments of the inventive subject matter include a system that comprises a plurality of subsystems, a plurality of local data collectors, and a system collector. Each of the local data collectors is coupled with a corresponding subsystem of the plurality of subsystems. Each of the plurality of local data collectors is configured to periodically collect power management related data from the corresponding subsystem, and to format the periodically collected power management related data for conveyance along any one of a plurality of channels between the local data collector and a system collector. The system collector is coupled with each of the plurality of local data collectors via the plurality of channels. The system collector is configured to select from the plurality of channels between the system collector and each of the local data collectors based, at least in part, on states of the plurality of channels, and to retrieve the power management related data collected by each of the plurality of local data collectors along a selected channel for the local data collector.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, the description refers to examples that collect thermal data and performance data for power management. Embodiments can collect other data, such as power consumption measurements. In other instances, well-known instruction instances, protocols, structures and techniques have not been shown in detail in order not to obfuscate the description.

A system collects information from sensors and performance monitors positioned throughout a system to manage power consumption. The sensors and monitors collect information from memory devices, input/output controllers, graphic cores, etc. The channels that carry the information in a typical system architecture can be insufficient to meet the demands of timeliness for effective power management. The lack of timeliness leads to improper power management actions, which negatively impacts system performance.

A system architecture can be designed to select a most efficient channel from multiple available channels to convey power management data (e.g., a combination of thermal data and performance data). Since a complex system will include multiple subsystems that are subject to and/or affect power management, data collection is localized for scalability. A local power management data collector collects power management data for a given subsystem at periodic time intervals. A system power management data collector collects the power management data from each of the local power management data collectors at the periodic time intervals. For a given time interval, the system power management data collector selects a most efficient channel between the system power management data collector and each of the local power management data collectors to obtain the local power management data. The efficiency of a channel can vary across channels because of different channel characteristics (e.g., channel bandwidth and channel frequency) and various use and users of the channels. The flexibility to select a most efficient channel in a given time interval allows power management to operate in a dynamic system while satisfying the demands of timeliness for power management.

Figure 1:
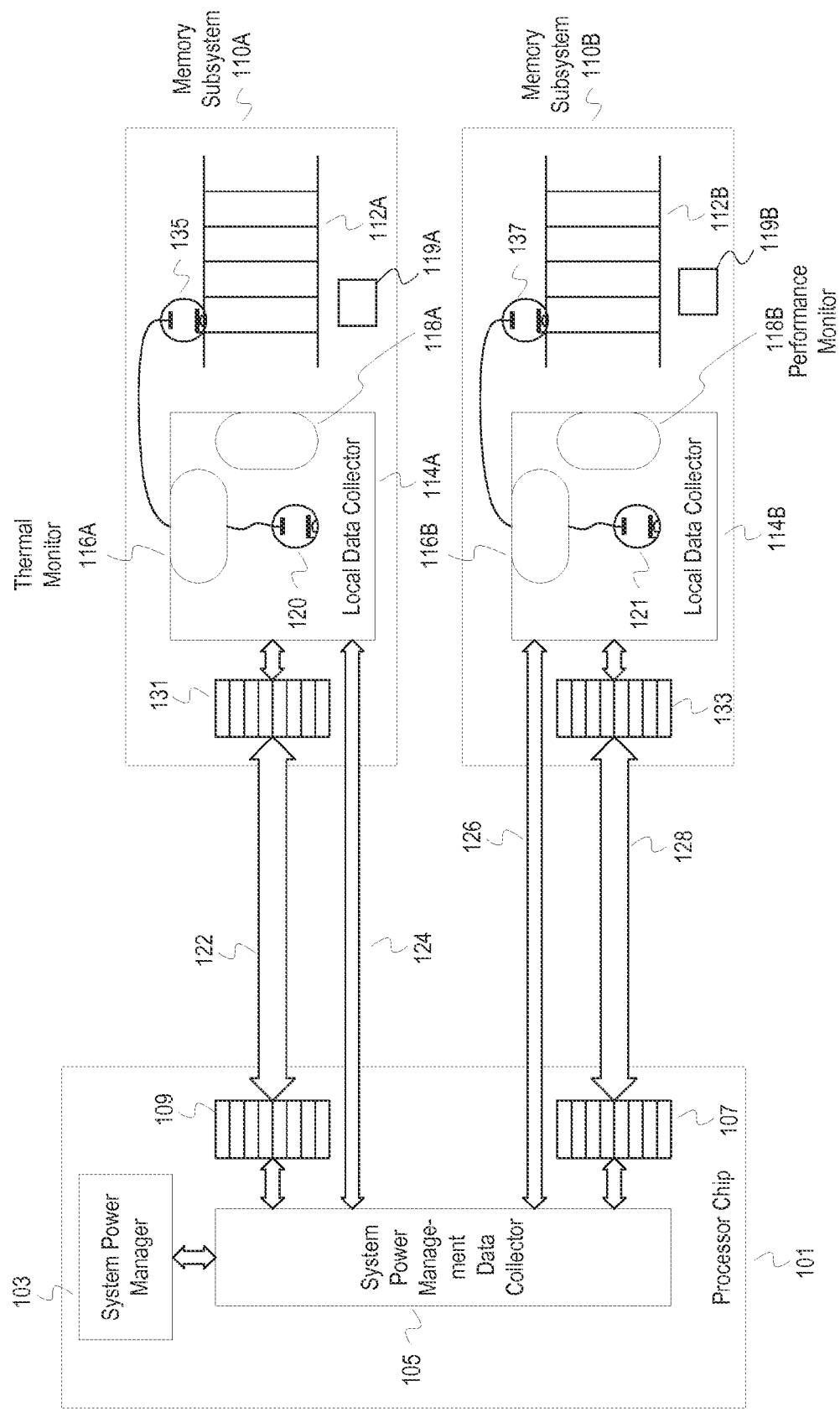
FIG. 1 depicts a conceptual diagram of an example system with localized power management data collection and dynamic channel selection to carry local power management data.

FIG. 1 depicts a conceptual diagram of an example system with localized power management data collection and dynamic channel selection to carry local power management data. The depicted system includes a processor chip 101, a memory subsystem 110A, and a memory subsystem 110B. The processor chip 101 includes a system power manager 103 and a system power management data collector 105. The system power manager 103 can be implemented with an on-chip controller. The system power manager 103 performs tasks to manage power consumption across a system. The system power management data collector 105 can be implemented with a configurable/programmable digital logic. Embodiments can also implement the system power management data collector with firmware in a system power manager or firmware executed by a processor. The system power manager can also be implemented with firmware on a processor chip.

For this example illustration, the memory subsystems 110A and 110B have similar configurations. The memory subsystem 110A includes memory cells 112A and an on-chip local data collector 114A. The memory subsystem 110B includes memory cells 112B and an on-chip local data collector 114B. A data collector can be implemented with an on-chip controller, implemented by modifying circuitry and firmware of subsystem controllers 119A and 119B (e.g., modifying a memory controller), implemented as configurable/programmable logic, etc. A thermal sensor 120 senses temperature of logic at the local data collector 114A. A thermal sensor 135 senses temperature of the memory cells 112A. A thermal sensor 121 senses temperature of logic at the local data collector 114B. A thermal sensor 137 senses temperature of the memory cells 112B. An example of a thermal sensor includes a thermal diode.

The local data collectors 114A, 114B are configured to respectively collect thermal data and performance data about the memory subsystems 110A, 110B. For instance, each of the local data collectors 114A, 114B is programmed with code (e.g., firmware) that instructs the local data collector how to format and package the thermal data and performance data collected by the local data collector. The code/digital logic for handling thermal data for the local data collector 114A is logically depicted as a thermal monitor 116A. The code/digital logic for handling performance data for the local data collector 114A is logically depicted as a performance monitor 118A. Likewise, local data collector 114B is depicted as including a thermal monitor 116B and a performance monitor 118B. For the memory subsystem 110A, the thermal sensors 120, 135 supply thermal data to the thermal monitor 116A. For the memory subsystem 110B, the thermal sensors 121, 137 supply thermal data to the thermal monitor 116B. The performance monitors 118A, 118B collect performance data. The subsystem controllers 119A and 119B may also be configured to act as performance monitors and collect performance data. Examples of collecting performance data include reading event counters that represent frequency of various performance related events (reads, writes, hits, misses, changes in power consumption, etc.). Another example of collecting performance data includes computing inter-arrival times for events (i.e., amount of time passing between events). The performance monitor 118A collects performance data for the memory subsystem 110A, and the performance monitor 118B collects performance data for the memory subsystem 110B.

Multiple channels are available to carry power management data from each of the memory subsystems 110A, 110B to the system power management data collector 105. A channel may be an interconnect or a bus. Examples of a channel include a serial peripheral interface interconnect bus, an inter-IC bus, a system management bus, and a point-to-point processor interconnect. Either a channel 122 or a channel 124 can be employed to carry power management data from the local data collector 114A to the system power management data collector 105. Likewise, either a channel 126 or a channel 128 can be employed to carry power management data from the local data collector 114B to the system power management data collector 105. When collecting power management data for the memory subsystem 110A, the system power management data collector 105 determines which of the channels 122, 124 can more efficiently provide access to the local power management data of the memory subsystem 110A in a given time interval. When collecting power management data for the memory subsystem 110B, the system power management data collector 105 determines which of the channels 126, 128 can more efficiently provide access to the local power management data of the memory subsystem 110A in a given time interval.

The channels in FIG. 1 are depicted differently based on slightly different assumptions. The channels 124, 126 are depicted as point-to-point channels between the system power management data collector 105 and the local data collectors 114A, 114B, respectively. For instance, the channel 124 may be a service channel used by the processor chip 101 to configure a buffer chip of the memory subsystem 110A, assuming the buffer chip embodies the local data collector 114A. The local data collector 114A writes collected power management data into a memory location of the local data collector 114A (e.g., a register file) that is accessible via the channel 124. Similarly, the local data collector 114B writes collected power management data into a memory location of the local data collector 114B that is accessible via the channel 126. Before writing the power management data, however, the local data collectors 114A, 114B package collected thermal data and performance data into power management data. The local data collectors 114A, 114B then format the power management data as appropriate for transfer over the channels 124, 126, respectively. When the system power management data collector 105 collects power management data via the channels 124, 126, the system power management data writes the collected power management data to a memory location accessible to the system power manager 103. Although FIG. 1 depicts the channels 124, 126 as point-to-point between the system power management data collector 105 and the local data collectors 114A, 114B, the system power management data collector 105 will access the channels 124, 126 with corresponding channel controllers.

FIG. 1 depicts the channels 122, 128 with associated memories and interconnects. The local data collector 114A writes data to a memory 131 (e.g., a register file). The local data collector 114B writes to a memory 133. The local data collector 114A either writes directly to the memory 131 or via a controller for the memory 131. Likewise, local data collector 114B either writes directly to the memory 133 or via a controller for the memory 133. When ready to collect data, the system power management data collector 105 will submit requests to a controller of the channel 122 and to a controller of the channel 128. In response to the request, the controller of the channel 122 retrieves the data from the memory 131. The controller then writes the data into the memory 109 and notifies the requestor. In response to the notification, the system power management data collector 105 reads the data from the memory 109 and communicates the power management data to the system power manager 103. Likewise, the controller of the channel 128 retrieves the data from the memory 133 in response to the request from the system power management data collector 105. The controller of the channel 128 then writes the data into the memory 107 and notifies the requestor. In response to the notification, the system power management data collector 105 reads the data from the memory 107 and communicates the power management data to the system power manager 103. The system power manager 103 periodically manages power consumption/delivery to the various subsystems based on the data provided by the system power management data collector 105.

Although FIG. 1 only depicts collection of thermal data and performance data, embodiments can collect other data, such as power consumption measurements. As an example, a power measuring device can collect power consumption measurement from a memory subsystem. A memory subsystem can include analog/digital converters of voltage across sense resistors (current measure) on power rails that supply power to memory modules as well as measurement of supplied voltage (sensing the drop between the rail and ground). Together these could be used to compute the power consumed from that voltage rail to the memory sub-system, at a local power consumption monitor. Similar to the other monitors, the power consumption monitor, can present the power consumption measurements to the local data collector periodically with or without modification (e.g., demarcating measurements sensed from different power rails, computing an average, etc.).

Figure 2:
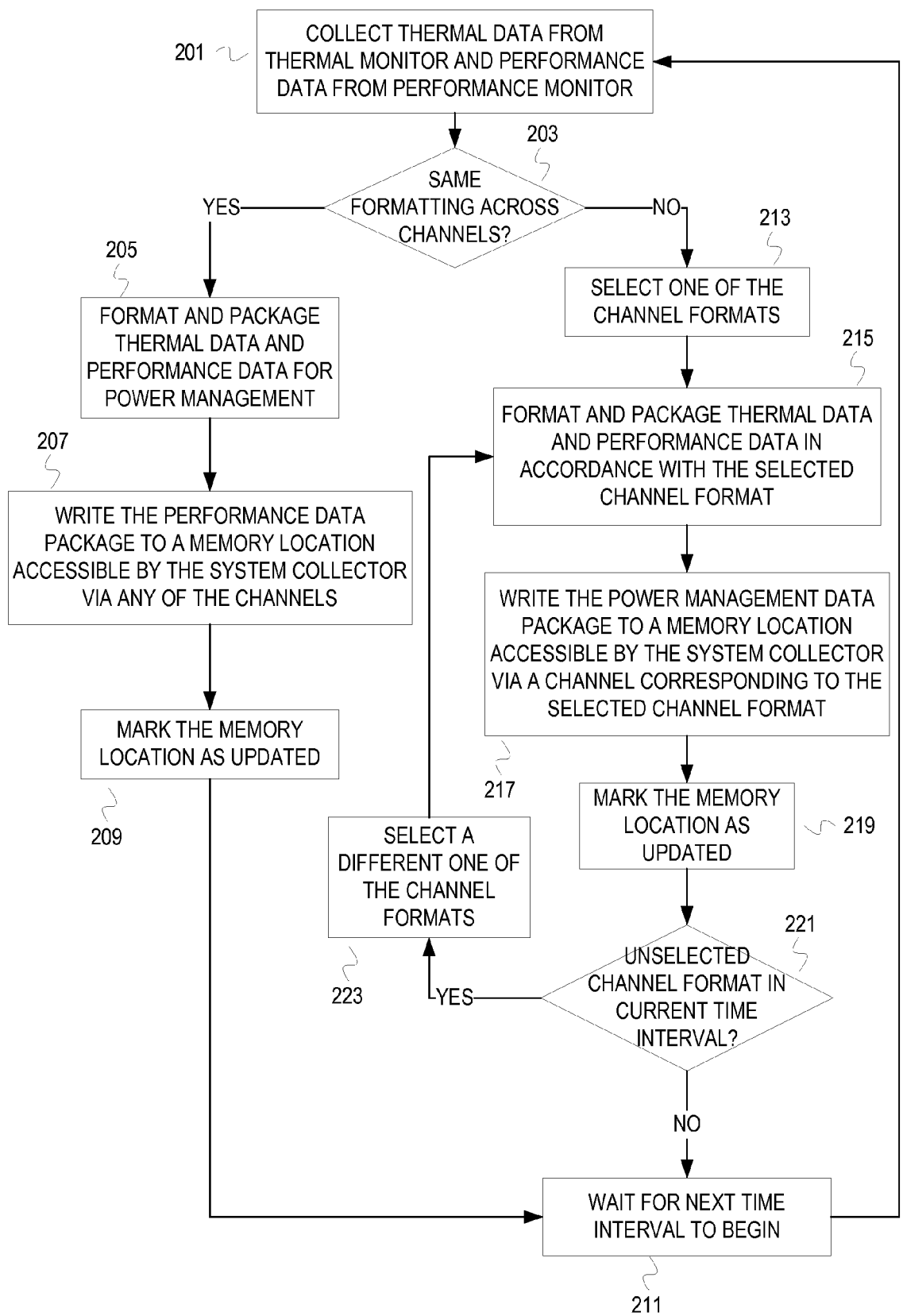
FIG. 2 depicts an example flowchart of operations for local collection of power management data from a managed subsystem.

FIG. 2 depicts an example flowchart of operations for local collection of power management data from a managed subsystem. The operations can be implemented with firmware that programs an on-chip controller, an application specific integrated circuit, a programmable/configurable digital logic controller, etc.

At block 201, thermal data is collected from a thermal monitor and performance data is collected from a performance monitor. The monitors can be implemented as part of a local data collector or separate code and/or hardware. The thermal monitor obtains thermal data from one or more thermal sensors (e.g., thermal diodes) located in the subsystem managed by the local data collector. If the thermal monitor collects thermal data from multiple sensors, the thermal monitor can preserve the individual measurements of temperature or combine the measurements (e.g., compute an average of the thermal data). The performance monitor reads a counter or counters of the subsystem of various performance related events that occur in the subsystem. The performance monitor may also compute time between events (i.e., inter-arrival event data). The thermal data and performance data may be written to memory owned by the local data collector (e.g., cache).

At block 203, it is determined whether the formatting across channels between the local data collector and a next level data collector (e.g., the system power management data collector) is the same. For example, the channels may have different widths, frequencies, header specifications, etc. The same code may be installed into multiple systems of varying architectures. After boot-up, the chip configured or programmed to operate as a local data collector (i.e., the chip executing the installed code) will communicate with channel controllers accessible by the local data collector to compare formatting of the channels. If the formatting is homogenous across channels, then control flows to block 205. Otherwise, control flows to block 213.

At block 205, the thermal data and performance data are formatted and packaged for power management. For example, the thermal data and performance data are formatted to fit 8 byte registers/buffers, and identifiers inserted to demarcate the thermal data from the performance data. The thermal data and the performance data can be tagged by the corresponding monitors or by the local data collector. The corresponding monitors or the local data collector may also add error/status fields for the packaged data to indicate errors for particular aspects of the data and/or issues with the local data collection. For example, the thermal monitor inserts fields before thermal data from each thermal sensor, and the local data collector adds header fields for the power management data package. The thermal monitor inserts an error flag in a field corresponding to the thermal data from a thermal sensor that reports thermal data that substantially deviates from neighboring thermal sensors and an identifier of the thermal sensor. The local data collector can write into the package header an offset/pointer corresponding to the field and an indication of a fault for the local data collection. Embodiments may also encapsulate the thermal data and the performance data for packaging. Additionally, the local data collector may add header information to the power management data (i.e., the thermal data and performance data) to comply with the channel specification.

At block 207, the performance data package is written to a memory location accessible by the system power management data collector via any of the channels. For instance, the local data collector writes the performance data package (i.e., formatted and packaged thermal and performance data). For example, the local data collector formats and packages thermal data and performance data in memory (e.g., cache) owned by the local data collector. The local data collector then writes the data as formatted and packaged from the memory owned by the local data collector to the memory accessible by any one of the channels. This assumes that all of the channels have access to the memory. In some cases, channels may have homogenous formatting but access to different memories. For those cases, embodiments may write the performance data package to multiple of the memories for an increased number of candidate channels to carry the performance data package to the system power management data collector.

At block 209, the memory location is marked as updated. Marking the memory location indicates tracks which locations host new data and which host stale data (i.e., data already communicated to the system power management data collector). Examples of marking the memory location include setting a flag and writing a timestamp. Control flows to block 211 from block 209.

At block 211, the local data collector waits for the next time interval to begin. Control flows from block 211 back to block 201.

If formatting across channels was determined to be heterogeneous at block 203, then one of the channel formats is selected at block 213. For example, a first format may be for 8 byte register/buffers corresponding to a service channel. A second format may be 128 bytes for 128 byte cache line channels. Selection of a channel format can involve accessing a structure that indicates, literally or referentially, the different channel formats. The structure can be populated at system start-up.

At block 215, the thermal data and performance data is packaged in accordance with the selected channel format. Formatting and packaging can be done in accordance with the various examples described with reference to block 205.

At block 217, the power management data package is written to a memory location accessible by the system power management data collector via one or more channels corresponding to the selected channel format. Similar to block 207, a local data collector may write the power management data package to multiple memories accessible by different channels that correspond to the selected channel format.

At block 219, the memory location is marked as updated. Again, the marking conveys that the data is available for reading by the system power management data collector.

At block 221, it is determined whether there is an additional channel format that has not been selected in the current time interval. For example, a local data collector may walk down a linked list of channel data format indications. When the local data collector arrives at the null value, then all channel formats have been selected. As another example, the local data collector can maintain a counter that is incremented for each selected channel format within a time interval, and reset upon expiration of the current time interval. If there an unselected channel format remains, control flows to block 223. If all channel formats have been selected in the current time period, then control flows to block 211.

At block 223, a different one of the channel formats is selected. Control flows from block 223 to block 215.

Figure 3:
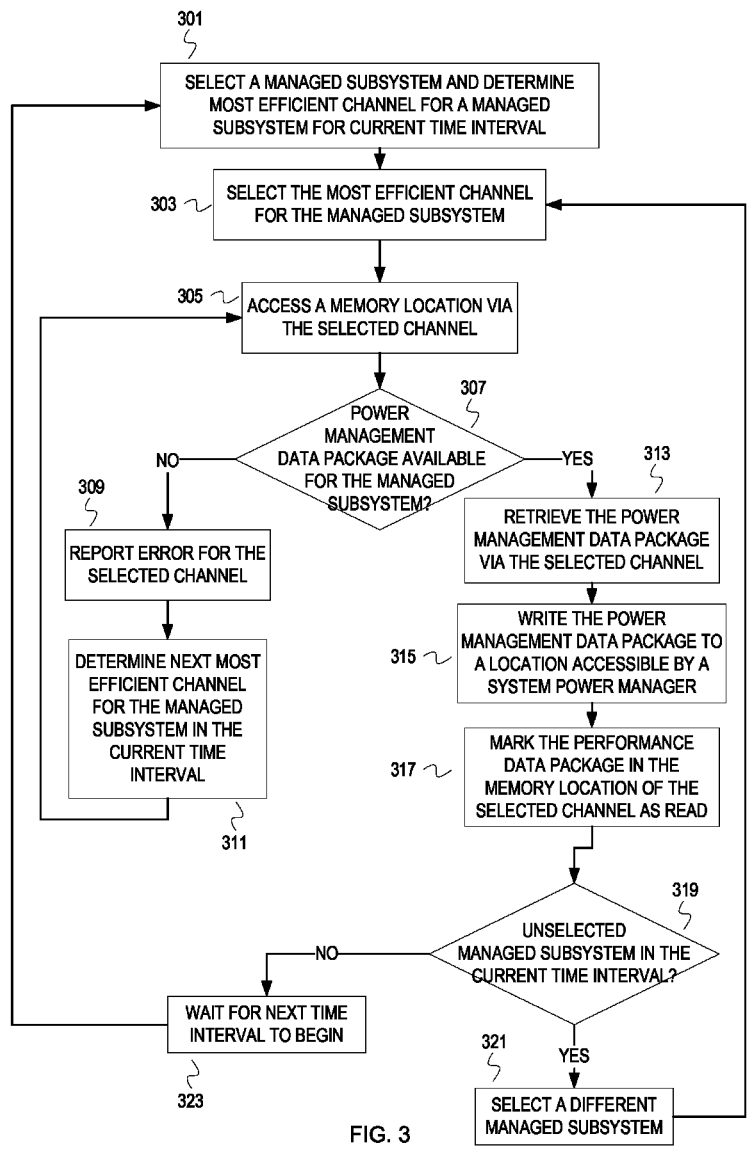
FIG. 3 depicts example operations of a system power management data collector.

FIG. 3 depicts example operations of a system power management data collector. The set of operations repeat for each time period, which is defined for the system power management data collector.

At block 301, a managed subsystem is selected and the most efficient channel for a managed subsystem is determined for a current time interval. A system power management data collector ("system collector") can query each channel controller for information that indicates channel efficiency with respect to channel state and channel characteristics for channels to a particular subsystem. For example, a first channel may be considered more efficient than a second channel because of greater bandwidth (i.e., channel characteristic). But the first channel may have greater latency (i.e., channel state) because of heavy use. Although the efficiency with respect to channel state is determined for the current time interval, the information indicating channel state efficiency may describe channel state in a previous time interval. The system collector can query channels for subsystems asynchronously and select a subsystem when all corresponding channels respond. Some embodiments prioritize the subsystems. Thus, the system collector queries channels in accordance with subsystem priority. For example, the memory subsystem may have priority over the input/output (I/O) subsystem. Hence, the system collector queries the channel controllers of channels to the local data collector of the memory subsystem before querying the channel controllers of channels to the local data collector of the I/O subsystem. Embodiments may query all channel controllers, and then select channels in accordance with priority. In some cases, multiple subsystems may have a same priority. For instance, a graphics subsystem and the memory subsystem may be defined in a time interval as having a same priority. The system collector queries the channel controllers of channels to both systems and collects power management data from the local data collector that has all channels responding.

At block 303, the most efficient channel for the subsystem is selected. For instance, the system collector selects the channel with the lowest latency. Embodiments can input the channel state and channel characteristic into a function that output a value that represents efficiency. For example, the system collector may use a function that computes efficiency based on both latency and bandwidth of a channel.

At block 305, a memory location is accessed via the selected channel. For example, a system collector submits a request for data to the controller of the selected channel.

At block 307, it is determined whether a power management data package is available for the managed subsystem. For example, the channel controller reads a memory location in memory of the subsystem's local data collector and determines whether an entry(ies) is marked as updated by the local data collector. If a power management data package is available, then control flows to block 313. If a power management data package is not available, then control flows to block 309.

At block 309, an error is reported for the selected channel. An error routine can determine whether the data package is not available because of an error in the local data collector, a faulty monitor, a problem with the selected channel, etc.

At block 311, the next most efficient channel for the managed subsystem is determined. A system collector can maintain the information about channel states and channel characteristics for the time period or across time periods. The system collector uses the maintained channel information to select the next most efficient channel. Control flows from block 311 back to block 305.

If a power management data package was available at block 307, then the power management data package is retrieved via the selected channel at block 313.

At block 315, the power management data package is written to a location accessible by a system power manager. For instance, a system collector transfers the power management data package to memory owned by the system power manager. The system collector may aggregate the power management data collected across the managed subsystems. A system collector may also organize the collected data into suitable buffers/memory accessible to a system power manager.

At block 317, the performance data package in the memory location of the selected channel is marked as read. The channel controller can mark the memory locations (e.g., buffers) at each end of the channel responsive to the system collector moving or copying the performance data package. The channel controllers may mark data as read as negotiated between the controllers. Depending upon the channel specification, the channel controllers may flush the buffers after reads are performed.

At block 319, it is determined if there is an unselected managed subsystem in the current time interval. The system collector can maintain data that indicate the managed subsystems from which power management data has been collected. Embodiments can also design buffers in the system collector for each managed subsystem. The system collector can determine whether a managed subsystem has been selected for data collection in a current time interval based on whether the buffers are empty. If there is an unselected managed subsystem in the current time interval, control flows to block 321. Otherwise, control flows to block 323.

At block 321, a different managed subsystem is selected. Control flows from block 321 to block 303.

At block 323, the system collector waits until the current time interval expires. Control flows from block 323 to block 301.

The flowcharts are provided to aid in understanding the inventive subject matter and are not intended to limit scope of the claims or inventive subject matter. Variations in the depicted example operations are possible for the inventive subject matter. For example, the operations depicted as distinct in blocks 205 and 207 of FIG. 2 may occur as a single operation. A local data collector may format and package data in the memory device that is accessible to the channels. Embodiments can format and package data in one location of the memory (e.g., a reserved scratch space) and then move/copy the formatted and packaged data to another location in the memory when ready for access by a channel. As another example variation, additional operations can be performed in FIG. 2 before block 211 to iterate through multiple subsystems managed by a local data collector. Furthermore, embodiments do not necessarily code to accommodate the possibility of either homogenous channel formats or heterogeneous channel formats. For instance, an embodiment can configure a local data collector to perform operations corresponding to blocks 205, 207, 209, and 211 without any decision making operation corresponding to block 203 or the operations of the NO branch. Similarly, an embodiment can configure a local data collector to perform operations corresponding to the NO branch of block 203 without a decision operation of block 203 and without the operations corresponding to the blocks of the YES branch from block 203.

With respect to FIG. 3, different operations can be performed to allow for late arrival of thermal data and/or performance data. Embodiments can set a flag indicating a potential problem for a selected channel of a managed subsystem and read data for a different managed subsystem. Before the time interval expires and after reading the data package for the different managed subsystem, the system collector can try to read the data package again from the selected channel of the managed subsystem before reporting an error. As another example variation, a system power manager can be notified of available power management data after block 315, after block 321, or after data for all managed subsystems have been collected in a time interval.

Figure 4:
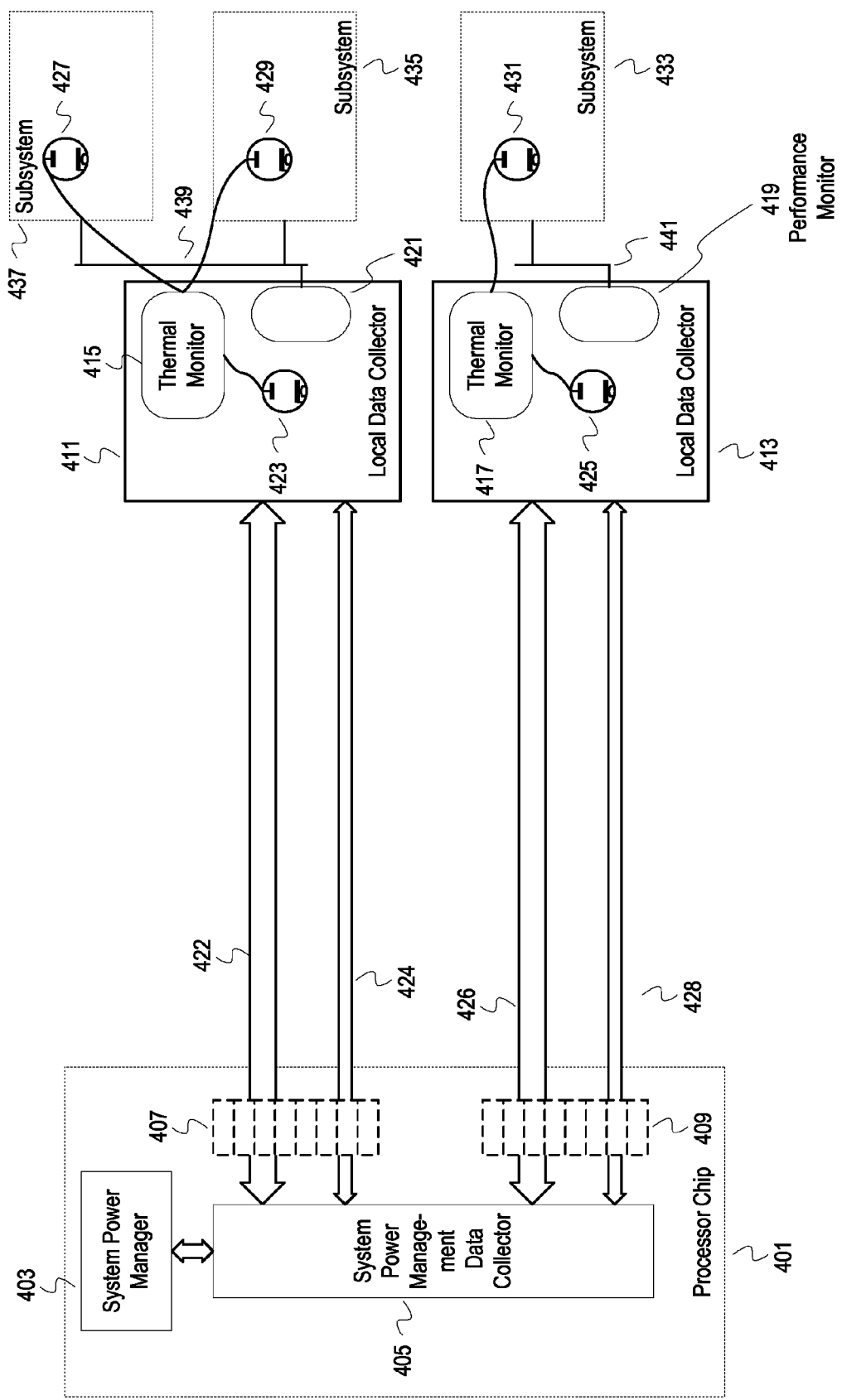
FIG. 4 depicts a conceptual diagram of an example system with a local data collector for multiple subsystems.

In addition to the already described embodiments, embodiments can implement the inventive subject matter in a hierarchical or nested manner. A local data collector may be responsible for multiple subsystems. Those subsystems may or may not have their own local data collectors, and local data collectors may be off-chip (e.g., a co-processor) and/or separate from the subsystem managed by the local data collector. For example, an I/O hub controller may have a local data collector that collects power management data for the I/O hub controller and from local data collectors of devices connected to the I/O hub controller (e.g., a graphics device, a peripheral component interconnect device, etc.). These connected devices can be considered smaller domains for local data collection, while the encompassing or larger domain includes these devices and the I/O hub controller. A local data collector collects power management data from a graphics device and reports that collected data to the local data collector of the I/O hub controller. Another local data collector collects power management data from a PCIe device and also reports that collected data to the local data collector responsible for the I/O hub controller domain. The larger domain local data collector formats and packages the data from the smaller domains and the I/O hub controller (i.e., formats and packages power management data for the larger I/O hub domain). FIG. 4 depicts a conceptual diagram of an example system with a local data collector for multiple subsystems. FIG. 4 depicts a processor chip 401, local data collectors 411, 413, and subsystems 437, 435, 433. The processor chip 401 includes a system power management data collector 405 in communication with a system power manager 403. The local data collector 411 includes a thermal monitor 415 and a performance monitor 421. The local data collector is coupled to a bus 439 that is also coupled with the subsystems 437, 435. The local data collector 413 includes a thermal monitor 417 and a performance monitor 419. A bus 441 couples the local data collector 413 with the subsystem 433.

The local data collector 411 collects power management data from the subsystems 437, 435. The thermal monitor 415 of the local data collector 411 collects thermal data from thermal sensors 423, 427, 429. The thermal sensor 423 senses temperature of the local data collector 411. The thermal sensor 427 senses temperature of the subsystem 437 (e.g., near memory cells). The thermal sensor 429 senses temperature of the subsystem 435 (e.g., a graphics processor). The performance monitor 421 collects performance data via the bus 439 from the subsystems 437, 435. The performance monitor 421 can query agents of the subsystems 437, 435. The agents read/maintain counters and compute inter-arrival event times. The local data collector 411 can be configured to communicate the power management data of the different subsystems managed by the local data collector 411 as distinct or to combine the power management data. For instance, the local data collector can be configured (or directed by the system power management data collector 405) to compute an average of the thermal data across the subsystems 437, 435 and the local data collector 411. Embodiments can also weigh the different data (e.g., giving greater weight to a subsystem than the local data collector thermal data).

The local data collector 413 collects power management data from the subsystem 433. The thermal monitor 417 of the local data collector 413 collects thermal data from thermal sensors 425, 431. The thermal sensor 425 senses temperature of the local data collector 413. The thermal sensor 431 senses temperature of the subsystem 433. The performance monitor 419 collects performance data via the bus 441 from the subsystem 433. The performance monitor 421 queries an agent of the subsystem 433. The agent reads/maintains counters and computes inter-arrival event times.

Multiple channels are available to carry power management data from each of the local data collectors 411, 413 to the system power management data collector 405. Either a channel 422 or a channel 424 can be employed to carry power management data from the local data collector 411 to the system power management data collector 405. Likewise, either a channel 426 or a channel 428 can be employed to carry power management data from the local data collector 413 to the system power management data collector 405. When collecting power management data from the local data collector 411, the system power management data collector 405 determines which of the channels 422, 424 can more efficiently provide access to the local power management data in a given time interval. When collecting power management data from the local data collector 413, the system power management data collector 405 determines which of the channels 426, 428 can more efficiently provide access to the local power management data in a given time interval.

The channels in FIG. 4 are depicted differently to represent the possibility of different channel characteristics, such as channel bandwidth. The channels 422, 426 are depicted as having greater bandwidth than the channels 428, 424. But the channels 424, 428 may operate at a higher frequency, be used by fewer components, etc. Some of the minimal details depicted in FIG. 1 are removed from this FIG. 4. The channels 422, 424, 426, 428 can have buffers and controllers at the local data collectors 411, 413. Similarly, the channels 422, 424, 426, 428 can have buffers and controllers at the processor chip 401. Buffers 407, 409 are depicted on the processor chip 401. The buffer 407 spans both channels 422, 424. Similarly, the buffer 409 spans both of the channels 426, 428. The buffers 407, 409 are depicted with dashed lines to account for possible embodiments in which each buffer is actually multiple buffers and for possible embodiments in which the buffers are shared across the channels.

The system power management data collector 405 operates similar to the system power management data collector 105 of FIG. 1. The system power management data collector 405 may perform additional operations on power management data to separate combined power management data since power management data may be combined for efficient communication from the local data collectors. The system power management data collector 405 may tag power management data to identify the source local data collector and/or corresponding subsystem.

Various embodiments are possible for a system power management data collector (e.g., the collector 105 in FIG. 1) to provide power management data to a system power manager (e.g., the system power manager 103 of FIG. 1). Some embodiments configure the system power management data collector to write collected power management data into a memory accessible by the system power manager. Embodiments can configure the system power management data collector notify the system power manager of when power management data is available in a given time period for any one of all subsystems, for each subsystem, or for a threshold number of subsystems. Some embodiments configure the system power management data collector to forward or pass the power management data to the system power manager directly (e.g., via an interconnect or bus in packets or messages).

Data collection, formatting and transmission actions at the local data collector can be triggered with different techniques—through an explicit command sent from the system power manager/system collector ("global command") through the communication channels to the local data collector or through a local timer function. With the global command, the collection is synchronous to demand for the data at the power management controller. Using a local timer function eliminates the command-transmission overhead for the data collection and also sets up a dependably periodic collection-transmission process at each of the local data collectors that implement the timer function. The local data collectors collect data in accordance with the locally produced periodic timing pulse that triggers the local data collector to collect, format, and package. The locally defined collection interval allows the triggering of local data collection to be self-contained with respect to the system power manger and/or system collector. And the locally defined collection interval allows local data collection to be asynchronous across local data collectors, as well as with respect to the system collector and the system power manager. Embodiments can employ both techniques to initiate data collection, formatting, and packaging within a system. Synchronization of data collection and demand for the data may be of more importance for certain subsystems/domains, while elimination of the command-transmission overhead has greater return for other subsystems/domains.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
each of a plurality of local data collectors,
periodically collecting power management data for a respective one of a plurality of subsystems in a system, wherein the power management data comprises thermal data and performance data;
within each recurrence of a time interval,
formatting the power management data collected within the time interval,
wherein said formatting is for conveyance along multiple of a plurality of channels between the local data collector and a system power management data collector, wherein said formatting comprises at least one of the plurality of data collectors formatting the collected power management data in accordance with at least two different formats corresponding to at least two different channels of the plurality of channels;
for each of the plurality of local data collectors,
selecting, by the system power management data collector, a first channel of the plurality of channels between the local data collector and the system power management data collector based, at least in part, on channel states of the plurality of channels; and
retrieving, by the system power management data collector, the power management data along the first channel.

2. The method of claim 1 further comprising managing power for the system based, at least in part, on the power management data collected from the plurality of local data collectors.

3. The method of claim 1 further comprising the system power management data collector periodically determining the channel states.

4. The method of claim 1, wherein said selecting the first channel of the plurality of channels is also based on channel characteristics of the plurality of channels.

5. The method of claim 1, wherein said periodically collecting the power management data comprises each of the plurality of local data collectors:
collecting the thermal data from thermal sensors that sense temperature throughout the respective one of the plurality of subsystems; and
collecting the performance data about the respective one of the plurality of subsystems.

6. The method of claim 5, wherein said collecting the performance data about the respective one of the plurality of subsystems comprises at least one of reading performance counters and determining inter-arrival time of events.

7. The method of claim 1 further comprising transmitting a command to at least a subset of the plurality of local data collectors, wherein the command initiates said periodically collecting the power management data.

8. The method of claim 1 further comprising at least a subset of the plurality of local data collectors periodically collecting the power management data in accordance with a local timer function.

9. The method of claim 1, wherein said formatting, by at least one of the plurality of local data collectors, comprises adding error or status information to the collected power management data before said retrieving of the power management data.

10. A system comprising:
a plurality of subsystems;
a plurality of local data collectors, each of which is coupled with a corresponding subsystem of the plurality of subsystems, each of the plurality of local data collectors having stored therein program code, the program code configured to cause the plurality of local data collectors to,
periodically collect power management data from the corresponding subsystem, wherein the power management data comprises thermal data and performance data;
within each recurrence of a time interval,
format the power management data collected within the time interval,
wherein said format is for conveyance along multiple of a plurality of channels between the local data collector and a system power management data collector, wherein said formatting comprises at least one of the plurality of data collectors formatting the collected power management data in accordance with at least two different formats corresponding to at least two different channels of the plurality of channels; and
the system power management data collector coupled with each of the plurality of local data collectors via the plurality of channels, the system power management data collector having stored therein program code, the program code configured to cause the system power management data collector to,
for each of the plurality of local data collectors,
select a first channel from the plurality of channels between the system power management data collector and the local data collector based, at least in part, on channel states of the plurality of channels;
retrieve the power management data along the first channel.

11. The system of claim 10 further comprising a system power manager having stored therein program code, the program code to cause the system power manager to manage power consumption by the plurality of subsystems based, at least in part, on the power management data provided by the system power management data collector.

12. The system of claim 10, wherein each of the plurality of local data collectors and the system power management data collector is configurable digital logic.

13. The system of claim 10, wherein the plurality of subsystems comprise two or more of a memory subsystem, an input/output subsystem, a communications subsystem, and a graphics subsystem.

14. The system of claim 10, wherein the system power management data collector further has program code to cause the system power management data collector to command at least a first of the plurality of local data collectors to initiate data collection.

15. The system of claim 10, wherein at least a first of the plurality of local data collectors further has program code to cause the first of the plurality of local data collectors to periodically collect the power management data from the corresponding subsystem of the plurality of subsystems in accordance with a timing pulse generated by the first local data collector.

16. The system of claim 10, wherein at least a first of the plurality of local data collectors further has program code to cause the first of the plurality of local data collectors to include error data in the power management data conveyed to the system power management data collector.

17. A computer program product for scalable data collection, the computer program product comprising:
a computer readable storage medium having computer usable program code embodied therewith, the computer usable program code comprising a computer usable program code configured to:
periodically collect power management data for a respective one of a plurality of subsystems in a system, wherein the power management data comprises thermal data and performance data;
format, within each recurrence of a time interval, the power management data collected within the time interval,
wherein said format is for conveyance along multiple of a plurality of channels, wherein said formatting comprises at least one of the plurality of data collectors formatting the collected power management data in accordance with at least two different formats corresponding to at least two different channels of the plurality of channels;
for each of a plurality of local data collectors,
select one of the plurality of channels from the local data collector based, at least in part, on channel states of the plurality of channels; and
retrieve the power management data related data along the selected one of the plurality of channels.

18. An apparatus comprising:
a plurality of subsystems each of which has a subsystem controller;
a plurality of thermal sensors that sense temperature throughout the apparatus, wherein each of the plurality of subsystems is associated with at least one of the plurality of thermal sensors;
at least one of the subsystem controllers having performance related event counters;
a plurality of local data collectors, each having stored therein program code, the program code configured to cause the plurality of local data collectors to periodically collect data about a corresponding subsystem of the plurality of subsystems,
wherein each of the plurality of local data collectors having stored therein program code, the program code configured to cause the plurality of local data collectors to collect data about the corresponding subsystem comprises,
each of the plurality of local data collectors having program code configured to cause the plurality of local data collectors to collect thermal data from the at least one of the plurality of thermal sensors associated with the corresponding subsystem,
a first of the plurality of local data collectors, which corresponds to the at least one of the subsystem controllers having performance related event counters, having program code configured to cause the first of the plurality of local data collectors to collect performance data about the corresponding subsystem based, at least in part, on the performance related event counters;
each of the plurality of local data collectors having stored therein program code, the program code configured to cause the plurality of local data collectors to format, within each recurrence of a time interval, collected data collected within the time interval,
wherein said formatting is for conveyance along multiple of a plurality of data channels between the local data collector and a processor, wherein said formatting comprises at least one of the plurality of data collectors formatting the collected power management data in accordance with at least two different formats corresponding to at least two different channels of the plurality of channels;
the plurality of data channels; and
the processor having stored therein program code, the program code configured to cause the processor to,
select from the plurality of data channels that couple the processor to each of the plurality of local data collectors based, at least in part, on states of the plurality of data channels, and to collect data from the plurality of local data collectors for system management via selected ones of the plurality of data channels.

19. The apparatus of claim 18 further comprising a power consumption measuring component in at least one of the plurality of subsystems, wherein the local data collector of the plurality of local data collectors, corresponding to the at least one of the plurality of subsystems with the power consumption measuring component, is configured to collect power consumption data from the power consumption measuring component.

* * * * *